(No Model.)
W. N. MORRISON.
DENTAL POLISHING DISK.
No. 425,897. Patented Apr. 15, 1890.
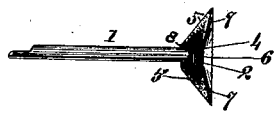
Fig. I.
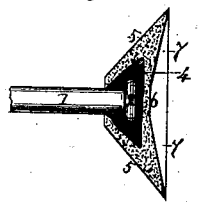
Fig. III.
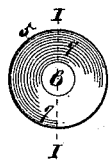
Fig. II.
Fig. IV.
Attest:
Charles Pickles.
E. Arthur.
Inventor:
William N. Morrison
By Knight Bro's
atty's.

UNITED STATES PATENT OFFICE.

WILLIAM N. MORRISON, OF ST. LOUIS, MISSOURI.

DENTAL POLISHING-DISK.

SPECIFICATION forming part of Letters Patent No. 425,897, dated April 15, 1890.

Application filed December 27, 1889. Serial No. 335,125. (No model.)

*To all whom it may concern:*

Be it known that I, WILLIAM N. MORRISON, of the city of St. Louis, in the State of Missouri, have invented a certain new and useful Improvement in Dental Polishers, of which the following is a full, clear, and exact description, reference being had to the accompanying drawings, forming part of this specification.

This invention relates to a rubber rotary disk for dental polishing, which is constructed with a soft-rubber polishing external surface and a hard-rubber core, which core stiffens the form of the friction-disk and secures its attachment to the mandrel that carries it.

Figure I is a vertical section taken on line I III, Fig. II, and shows the rubber polishing-disk molded or fitted over the head of the chuck-mandrel, and shows the hard-rubber core with its superficial incasement of a soft-rubber friction-surface. Fig. II is a front view of the rubber polishing-disk, and shows the central, preferably flat, plane thereof and its flaring peripheral extension-flange. Fig. III is an enlarged detail vertical section, a like view to that shown in Fig. I and taken on the same line, but enlarged to more clearly show its coadjutary parts; and Fig. IV is an enlarged vertical section of the rubber disk, which modification is molded, independent of the mandrel, with a tube center, in which any suitable mandrel may be secured.

Referring to the drawings, 1 represents the mandrel, and 2 is the head of said mandrel, on which the rotating rubber disk is attached. The mandrel is secured in the chuck of any suitable dental engine or other rotating device. The rubber polishing-disk is preferably molded over the head of the mandrel, but may, as in the modification shown in Fig. IV, be molded separate therefrom, and is afterward attachable to any suitable mandrel. The said rubber disk is molded or constructed of a hard-rubber core 4, that firmly seats the disk on and around the head and shoulder stem of the mandrel, and the soft-rubber friction-disk 5 is homogeneously molded around said hard-rubber core, so as to be inseparable therefrom.

6 represents a flat central plane on the face-surface of the friction-disk, which central plane is peripherally surrounded by a flaring projecting flange 7; but although the above form of disk is preferred I do not confine myself to said form, which may be modified without departing from the essential features of the invention.

In the modification in Fig. IV is shown a rubber disk friction-head that has been individually molded separate from the mandrel; but the construction is substantially the same, except that it is molded off instead of on the mandrel, and a tubular opening 8 is made in its center, into which any suitable mandrel is to be secured. This attachment may readily be effected by screw-threading the forward end of the mandrel (which in that case has no enlarged head) and screwing it into its seat within the hard-rubber core of the disk, or it may be attached and used on the usual dental screw-head mandrels.

By the use of this invention the hard-rubber core of the disk effects a firm attachment to the mandrel and firm backing of the soft-rubber friction-disk, and said soft-rubber superficial covering, although it is not to be depended on, as is the hard-rubber, to maintain its hold of the mandrel, yet it is the most suitable material for the friction-surface of the polishing-disk.

I claim as my invention—

1. In a dental polisher, a rotary rubber disk having a hard-rubber center core and superficial soft-rubber friction-surface, substantially as and for the purpose set forth.

2. In a dental polisher, the combination of the mandrel 1, the hard-rubber disk-core 4, carried by said mandrel, and the soft-rubber superficial friction-disk secured to said hard-rubber core, substantially as and for the purpose set forth.

WILLIAM N. MORRISON.

In presence of—
 BENJN. A. KNIGHT,
 A. M. EBERSOLE.